Figure 1:
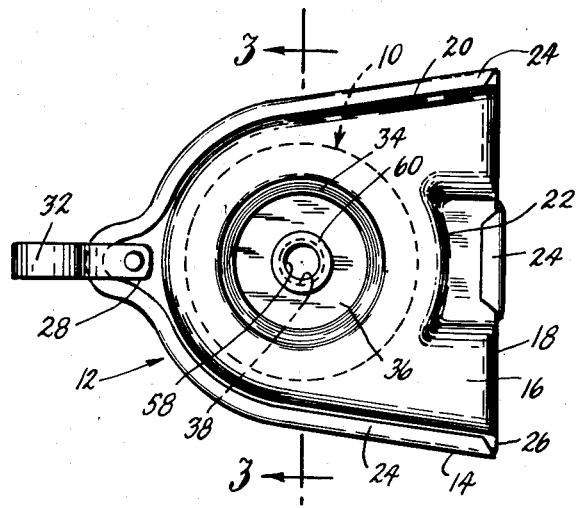

Sept. 25, 1962 M. E. CHAFT 3,055,639
PULLEY DEVICE

Filed July 16, 1956 2 Sheets-Sheet 1

INVENTOR.
MARC E. CHAFT
BY

Sept. 25, 1962  M. E. CHAFT  3,055,639
PULLEY DEVICE

Filed July 16, 1956  2 Sheets-Sheet 2

INVENTOR.
MARC E. CHAFT
BY

United States Patent Office 3,055,639
Patented Sept. 25, 1962

3,055,639
PULLEY DEVICE
Marc E. Chaft, 3207 Benjamin Road, Oceanside, N.Y.
Filed July 16, 1956, Ser. No. 598,104
4 Claims. (Cl. 254—190)

The present invention relates to light duty pulleys and pulley devices, especially of the type generally used for household purposes and particularly for indoor and outdoor clothes lines.

Pulleys of the type to which the present invention relates, especially those used with outdoor clothes lines, are continuously exposed, throughout their useful lives, to all of the ravages of the elements, such as the various forms of moisture and dampness, temperature changes, as well as dirt and grit carried in the air. As a result such pulleys quickly become clogged and rusted, and even those having their pulley wheel mounted on roller bearings quickly become difficult and noisy to move as a result of such rust and clogging.

It is the general object of the present invention to provide pulley wheels and pulley devices of the character described which are especially adapted for outdoor use by reason of their increased resistance to the deleterious effects of air and atmosphere.

It is, thus, one object of the present invention to provide a pulley of the character described having a housing or shell of improved construction, that is sturdier and stronger and will afford greater protection against the infiltration of dirt, grit and moisture.

It is also an object of the present invention to provide a pulley of the character described having bearing means which is resistant to the effects of the elements and will not rust or otherwise deteriorate from the effects of moisture and temperature change and will require no oiling or other servicing and will, therefore, remain indefinitely operatively effective and troubleproof.

It is another object of the present invention to provide a pulley having a bearing of the character described which will provide both axial and thrust bearings, to thereby make the operation of the pulley wheel both smooth, easy and rapid.

It is still another object of the present invention to provide a pulley having a bearing of the character described which may be easily, readily, economically and firmly assembled with the pulley and will be securely held in place thereon.

It is a still further object of the present invention to provide a pulley device of the character described which will provide maximum spread between the strands of a line mounted thereover in a minimum of depth, whereby the line may be grasped for moving in maximum proximity to the point of suspension of the pulley device, to provide enhanced safety for the user of the pulley when it is suspended for operation from a window, as with a clothes line.

It is a still further object of the present invention to provide a pulley device of the character described having means for automatically cleaning a line run thereover.

It is yet a further object of the present invention to provide pulleys and pulley devices of the character described which are formed of a minimum number of simple parts all of which may be economically mass produced and easily and economically assembled.

The foregoing and other objects and advantages of the pulleys and pulley devices of the present invention will become more readily apparent to those skilled in the art from the embodiments thereof shown in the accompanying drawings and from the description following. It is to be understood, however, that such embodiments are shown by way of illustration only, to make the principles and practice of the invention more readily comprehensible, and without any intent of limiting the invention to the specific details therein shown.

Figure 2:
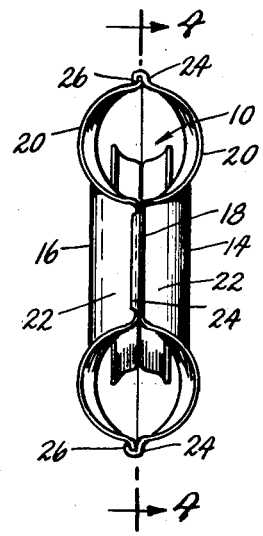
Figure 3:
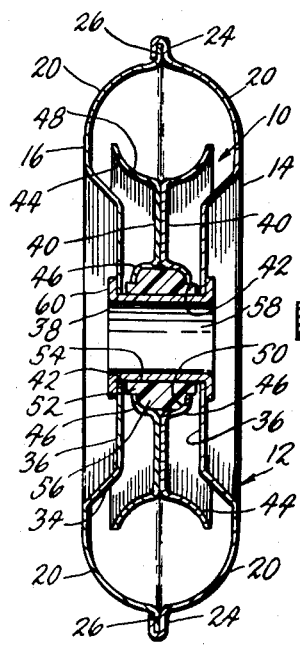
Figure 4:
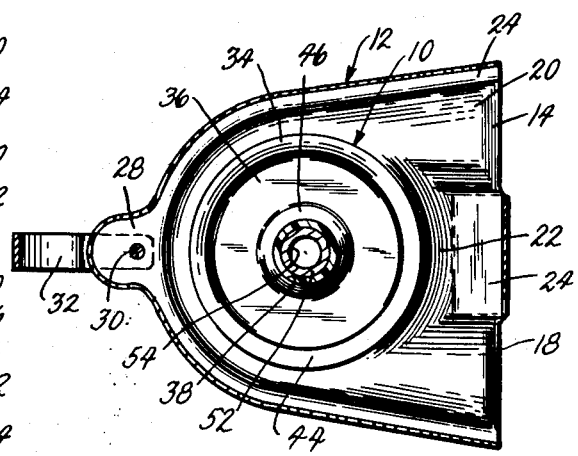
Figure 5:
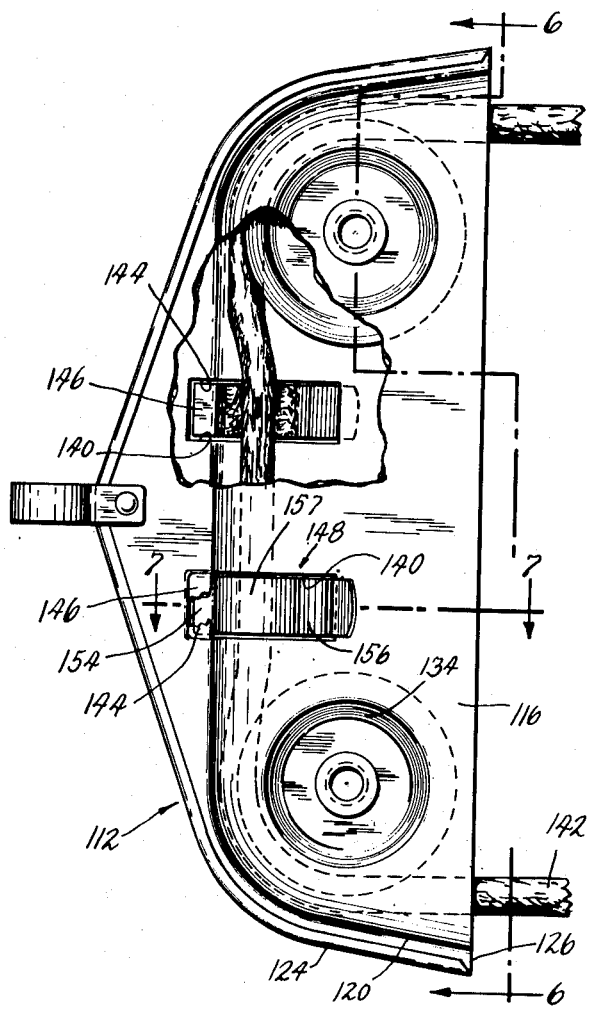
Figure 6:
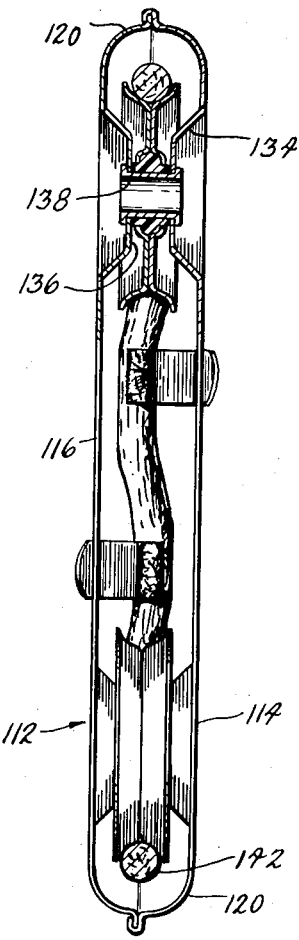
Figure 7:
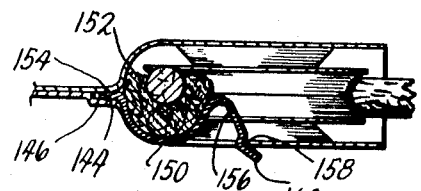

In the drawings:

FIG. 1 is a side elevational view of one embodiment of a pulley of the present invention;
FIG. 2 is an end view of the same;
FIG. 3 is a section taken on line 3—3 of FIG. 1;
FIG. 4 is a section taken on line 4—4 of FIG. 2;
FIG. 5 is a plan view, partly broken away, of a pulley device embodying the present invention;
FIG. 6 is a section taken on line 6—6 of FIG. 5; and
FIG. 7 is a section taken on line 7—7 of FIG. 5.

Referring to the accompanying drawings in greater detail, and with particular reference to FIGS. 1 to 4, inclusive, of the drawings, the pulley therein illustrated consists of a pulley wheel, generally designated as 10, and a combined casing and mounting for such wheel, generally designated as 12.

The casing 12 comprises a pair of casing sections, 14 and 16, both of the same general shape and formation and each consisting of a rigid, preferably metallic plate, preferably having a substantially continuous curve along three edges thereof and a substantially straight edge along its fourth side, 18. Each of plates 14 and 16 is formed with a curving, inturned marginal edge portion 20 along the curving sides thereof and a similar, curving, inturned marginal edge portion 22 along the center of the edge 18 thereof. Each of the inturned portions 20 and 22 is formed with an outwardly offset, flat flange, with the flange 24 of plate 14 being wider than the flange 26 of plate 16, so that when placed together the former may be folded over the latter. Each of the flanges 24 and 26 may be formed with an apical extension 28 through which an aperture 30 may be formed for the riveting of an ear 32 therethrough.

Each of the plates 14 and 16 may be formed with an approximately circular, relatively shallow centrally disposed depression, forming a circular embossment 34 having a flat surface 36 at the center of which an opening 38 is formed.

The wheel 10 is preferably formed of two identical sections, each generally designated as 40, and each consisting of a rigid, preferably metallic disc having a central opening 42 of a diameter greater than the opening 38 of plates 14 and 16, and having its outer marginal edge portion 44 and the marginal edge portion 46 of its central opening 42 outwardly curved, to provide, when the two discs are secured together with their marginal curved portions oppositely directed, an annular peripheral channel 48 to serve as a track for a line run over the wheel 10, and an annular, hollow hub channel 50 surrounding the openings 42.

The pulley of the present invention also comprises a tubular bearing, 52, having the diameter of its bore, 54, not greater than that of the openings 38 and an outer diameter equal approximately to but not greater than that of the openings 42. The bearing 52 is formed with an outer, central annular ridge, 56, which is adapted to be engaged and fit snugly and held in place within the channel 50, while its cylindrical end portions project through the openings 42 of the wheel discs 40. While the bearing 52 may be made of any self-lubricating alloy or material, I prefer to form the same, by molding, from nylon, which is durable, resistant to weather effects, requires no lubrication and operates smoothly and quietly.

The pulley of the present invention is further provided with an axle for the wheel 10, preferably in the form of an eyelet, 58, which is of greater length than the space between casing sections 14 and 16, which passes through the bearing 52, with its ends passing through and supported within openings 38 of the casing and projecting therefrom and swaged against their outer marginal edge portions, as at 60.

In assembling the pulley of the invention, a pair of wheel discs 40 are fitted back to back, each with its opening 42 fitted over the cylindrical end portion of a bearing 52, and its curved portion 46 over a part of the bearing 56, and in this position riveted or welded together to form a wheel 10, complete with bearing 52 held securely and firmly in place thereon.

An axle or eyelet 58 may then be placed through the bearing 52 and, over its projecting ends, a pair of casing plates, 14 and 16 mounted by their openings 38, with their embossments 34 facing and in registering position and with their flange sections 24 and 26 juxtaposed. When in this position, the eyelet ends may be swaged over, as at 60, and the flange sections 24 of plate 14 folded over the flange sections 26 of plate 16. The ear or loop 32 may then be secured in place.

It will be clearly seen that the assembled pulley described above, by reason of the folded seam formed along three sides thereof is provided with a strong and durable casing that is moisture and dirt proof along those three sides and affords maximum protection to the interior of the casing and to the wheel mounted therein.

It will also be apparent that the wheel of the pulley of the invention is fully bearing supported, for maximum ease of rotation at all times, even after prolonged use and exposure, because of the character of the bearing used and because it serves both, as a rotary bearing over the axle or eyelet 58 and as a thrust bearing at each of its ends against a surface 36 of a casing plate embossment 34.

In FIGS. 5-7, inclusive, of the drawings, there is illustrated an embodiment of the invention in the form of a two-wheel pulley, for use in lieu of the large wheel pulleys now often used with clothes lines, or the like, for easier movement of the clothes line and for greater spacing between its strands, or which may be used, in association with a pulley of FIGS. 1 to 4, as a light duty block and tackle.

The pulley of FIGS. 5-7 comprises a housing, 112, of similar construction to the housing or casing 12 of FIGS. 1-4, wider than casing 12, to accomodate two of the wheels 10, in spaced relation to one another, but of substantially no greater depth. Such housing or casing 112 may consist of plates 114 and 116, each having the curved, inwardly turned marginal edge portion along all but one side thereof, designated as 120, and each having flat, offset outwardly extending flanges, 124 and 126, respectively, with the flange 124 of plate 114 wider than flange 126 of plate 116 and folded thereover to form a moisture and dirt proof seam on three sides of the casing 112.

The casing plates 114 and 116 are each formed with a pair of spaced inwardly extending embossments, 134, in register with that of the other of the plates, and each embossment having a flat inner face, 136, through which is formed a pulley wheel supporting opening, 138. The casing 112 supports a pair of pulley wheels, such as the pulley wheels 10, each with its nylon bearing 52 and each supported by an eyelet axle, 58, passing and swaged over the registering openings 138, which eyelets also serve to hold the casing plates in assembled position.

It will be seen that the pulley of FIGS. 5-7 provides a substitute for the large wheel pulleys now used which is of shallower depth and permits the engagement of the rope or line associated therewith in greater proximity to the point of pulley suspension, providing enhanced safety for users of the pulley of the present invention when it is suspended and operated from a house window, as it requires less leaning out by the operator to grasp the rope or line.

Means for automatically cleaning a line or rope supported on pulley wheels 10, to remove accumulated atmospheric dirt therefrom, as it moves through the pulley, are illustrated in association with the pulley embodiment of FIGS. 5-7. Such means comprise a preferably rectangular opening, 140, formed preferably in each of plates 114 and 116, extending from a point at the outer edge of the curved marginal edge portion 120 of each of the plates, transversely across the path of a line or rope, 142, carried over the pulleys 10, and a distance inwardly of such path. The automatic cleaning means also includes a recess, 144, extending outwardly from the outer end of the opening 140, between an embossment, 146, formed in the flange of the casing in which such opening 140 is formed and the flange of the companion casing plate.

The cleaning means further comprises an elongated strip of preferably resilient material, such as spring steel, generally designated as 148, bent along its length to provide an approximately semi-circular portion, 150, on the inner face of which is secured, in any suitable desired manner, as by an adhesive, a wiping or brushing element, 152, which may consist of a section of felt or similar material. The arcuate portion 150 is formed with a laterally and outwardly extending flange, 154, at one end, adapted to fit in the recess 144, and with a diagonally rearwardly extending arm, 156, at its other end; the latter being formed with an indentation, 158, near its free end.

The strip 148 is of such length and so formed and shaped that the distance from the base of its flange 154 to the indentation 158 of the arm 156 is somewhat greater than the length of opening 140; so that when flange 154 is fitted into recess 144 and the strip pushed inwardly into the opening 140, the indentation 158 will snap over the adjacent edge of the opening 140, to retain the strip 148 in place, with the wiping element 152 in contact with approximately half the thickness of the line 142, and with the extreme end, 160, of the strip 148 projecting to the exterior of the casing plate and serving as finger piece by which the strip 148 may be removed for replacement or for the replacement of the wiping element 152. It will be clear that, when a strip 148 is mounted in each of the casing sections, as 114 and 116, across the path of the line 142, preferably in staggered position relative one another, the entire thickness of the line 142 will be wiped by the two elements 152, as it is moved along through the pulley casing 112.

While the line cleaning means of the present invention has been illustrated and described in connection with the two-wheel pulley embodiment of the invention, it may here be stated that such line cleaning means may be provided in association with the single wheel pulleys of the invention, as by providing one cleaning strip and suitable receiving opening therefor, adjacent each casing outlet, in close proximity to the wheel 10.

This completes the description of the pulleys and pulley devices of the present invention. It will be readily apparent that they are formed of a minimum of parts that may be easily and rapidly assembled with a minimum of operations. It will also be apparent that they are of enhanced strength and durability and more weather and dirt proof than any similar articles heretofore used.

It will be further apparent that numerous variations and modifications may be made in the pulleys and pulley devices of the present invention, by any one skilled in the art, in accordance with the principles of the invention hereinabove set forth and without the exercise of any inventive ingenuity. I desire, therefore, to be protected for any and all such variations and modifications that may be made within the spirit of the invention and the scope of the claims hereto appended.

What I claim is:

1. A pulley comprising a casing, said casing comprising a pair of wall plates each including a flat central portion and a channel portion surrounding said central portion, and a peripheral, outwardly offset flange on said channel portion, the flange of one of said wall plates being of greater width than that of the other of said wall plates, said wall plates juxtaposed with their flanges engaging against one another and with the said wider flange folded over the said narrower flange to secure said walls on one another with their flat central portions in spaced-apart relation, each of said flat portions having an opening formed therethrough in register with the other, a tubular axle supported in said openings, said axle having its ends turned to engage against the outer marginal edge portions of said openings, a bearing mounted over said axle between said wall sections, said bearing having an inner cylindrical bearing surface and parallel end bearing surfaces engageable against the inner marginal edge portions of said openings, a pulley wheel having a central opening secured by said opening on said bearing, one of said casing walls having an opening formed in the channeled portion thereof along the path of a line moved over said pulley wheel, and a line-cleaning member removably supported within said opening.

2. The pulley of claim 1, wherein said line-cleaning member comprises a strip of material including an arcuately bent portion having a cleaning element secured to its outer surface, said strip of material inserted into said opening with its arcuate portion extending into said casing in position to engage against said line, and wherein means are provided for removably securing said member within said opening.

3. The pulley of claim 1, wherein said line-cleaning member comprises a strip of material including an arcuately bent portion having a cleaning element secured to its outer face, said strip of material inserted into said opening with its arcuate portion in position to engage against said line, and including means for retaining said strip within said opening, comprising an embossment formed in the wall plate having said opening and forming a recess with the other of said wall plates extending outwardly from one edge of said opening, a flange at one end of the arcuate portion of said strip fitting into said recess, and an arm extending diagonally rearwardly from the other end of said arcuate portion, said arm having an indentation formed therein for engaging over an opposed edge portion of said opening.

4. A pulley, including a casing comprising a pair of casing wall plates each including a peripheral channel portion, said plates secured to one another by their outer peripheries and supporting a pulley wheel between them adapted to have a line moved thereover through said channel portions and removable means for cleaning said line comprising an opening formed in one of said plates across said channel portion thereof along the path of said line, and a cleaning member, including a strip of material having a curved portion and a cleaning element secured on the outer surface of said curved portion, said strip disposed within said opening its curved portion inwardly extending, and means for removably securing said strip within said casing.

References Cited in the file of this patent

UNITED STATES PATENTS

| | | |
|---|---|---|
| 757,088 | Brinley | Apr. 12, 1904 |
| 873,408 | Brinley et al. | Dec. 10, 1907 |
| 1,102,965 | Smith | July 7, 1914 |
| 1,796,673 | Truxell | Mar. 17, 1931 |
| 1,819,334 | North | Aug. 18, 1931 |
| 1,868,761 | Pease et al. | July 26, 1932 |
| 2,140,426 | Hodson | Dec. 13, 1938 |
| 2,147,183 | Zimbalist | Feb. 14, 1939 |
| 2,355,003 | McCann | Aug. 1, 1944 |
| 2,459,598 | Stott | Jan. 18, 1949 |
| 2,497,224 | Laure | Feb. 14, 1950 |
| 2,538,584 | Mueller | June 16, 1951 |
| 2,646,232 | Olson | July 21, 1953 |
| 2,760,378 | Van Deventer | Aug. 28, 1956 |
| 2,797,510 | McLarty | July 2, 1957 |